(12) United States Patent
Balz

(10) Patent No.: US 9,539,972 B2
(45) Date of Patent: Jan. 10, 2017

(54) METHOD AND DEVICE FOR OPERATING A TRIGGER DEVICE FOR OCCUPANT PROTECTION MEANS

(71) Applicant: Robert Bosch GmbH, Stuttgart (DE)

(72) Inventor: Stefan Balz, Besigheim (DE)

(73) Assignee: Robert Bosch GmbH, Stuttgart (DE)

( * ) Notice: Subject to any disclaimer, the term of this patent is extended or adjusted under 35 U.S.C. 154(b) by 5 days.

(21) Appl. No.: 14/365,094

(22) PCT Filed: Dec. 17, 2012

(86) PCT No.: PCT/EP2012/075793
§ 371 (c)(1),
(2) Date: Jun. 12, 2014

(87) PCT Pub. No.: WO2013/092490
PCT Pub. Date: Jun. 27, 2013

(65) Prior Publication Data
US 2015/0115747 A1 Apr. 30, 2015

(30) Foreign Application Priority Data
Dec. 20, 2011 (DE) .................. 10 2011 089 147

(51) Int. Cl.
G05F 1/00 (2006.01)
B60R 21/017 (2006.01)
B60R 21/01 (2006.01)

(52) U.S. Cl.
CPC ......... B60R 21/017 (2013.01); B60R 21/0173 (2013.01); *B60R 2021/01143* (2013.01); *B60R 2021/01252* (2013.01)

(58) Field of Classification Search
CPC ..... H02M 3/156; H02M 3/158; H02M 3/1588
USPC ........................................................ 323/282
See application file for complete search history.

(56) References Cited

U.S. PATENT DOCUMENTS

| 5,181,011 A | 1/1993 | Okano |
| 5,406,127 A | 4/1995 | Furui et al. |
| 2004/0189269 A1* | 9/2004 | Lynch ................. H02M 3/1588 323/282 |

FOREIGN PATENT DOCUMENTS

| DE | 3925594 | 3/1990 |
| DE | 198 19 124 | 11/1999 |
| DE | 198 37 167 | 11/1999 |
| DE | 10 2007 046488 | 4/2003 |
| DE | 10 2004 037543 | 3/2006 |
| DE | 10 2005 030769 | 1/2007 |
| DE | 10 2005 054126 | 5/2007 |
| EP | 0 997 349 | 3/2002 |

(Continued)

OTHER PUBLICATIONS

International Search Report for PCT/EP2012/075793, dated Apr. 5, 2013.

*Primary Examiner* — Dharti Patel
(74) *Attorney, Agent, or Firm* — Norton Rose Fulbright US LLP; Gerard Messina

(57) ABSTRACT

A method for operating a trigger device for an occupant protection unit includes: activating a first switch (high side) of the trigger device for occupant protection units; activating a second switch (low side) of the trigger device for occupant protection units; detecting an output voltage at the second switch (low side); and deactivating the second switch (low side) as a function of the output voltage.

11 Claims, 3 Drawing Sheets

(56) References Cited

FOREIGN PATENT DOCUMENTS

| | | |
|---|---|---|
| JP | 04100755 A | 4/1992 |
| JP | 04362443 A | 12/1992 |
| JP | 05262201 A | 10/1993 |
| JP | 06191375 A | 7/1994 |
| JP | 11048908 A | 2/1999 |
| JP | 2007022450 A | 2/2007 |
| JP | 2009196541 A | 9/2009 |
| WO | WO 00/30902 | 6/2000 |

* cited by examiner

METHOD AND DEVICE FOR OPERATING A TRIGGER DEVICE FOR OCCUPANT PROTECTION MEANS

BACKGROUND OF THE INVENTION

1. Field of the Invention

The present invention relates to a method for operating a trigger device for occupant protection means, to a device for triggering occupant protection means, and to a control unit.

2. Description of the Related Art

A number of methods for operating a trigger device for occupant protection means are already known from the related art, in which at least two switches, so-called output stages, are activated for triggering purposes to connect at least one trigger means to a voltage supply.

Trigger devices for occupant protection means are generally electrical or electronic components. Trigger devices additionally come into play whenever high physical forces act on a vehicle, for example in the instance of a collision. For a wide variety of reasons, there is the possibility that a short circuit forms in the ignition circuit.

In today's trigger devices for occupant protection means, the output stages are always activated in a triggering instance even when short circuits are recognized in the ignition circuits. This increases the odds that the restraint means are activated. However, the output stages must be designed for a load from the short circuit currents.

Contrary to pyrotechnic actuators (seat belt tensioners, airbags), which become high-resistance after activation, it must be assumed in the case of inductive actuators (solenoid-operated switches for pedestrian protection, roll bars or the like) that current continues to flow in the ignition circuit even after triggering. This results in a higher load on the trigger devices.

BRIEF SUMMARY OF THE INVENTION

The core of the present invention is to provide a method and a device and a control unit which are designed in such a way that triggering of the occupant protection means is also possible in the event of an electrical short circuit to a supply voltage.

The method according to the present invention for operating a trigger device for occupant protection means, at least two switches being activated for triggering purposes to connect at least one trigger means to a voltage supply, includes the following steps:

activating a first switch of the trigger device for occupant protection means;

activating a second switch of the trigger device for occupant protection means;

detecting an output voltage at the second switch; and deactivating the second switch as a function of the output voltage.

The advantage of the presented method according to the present invention is that, as a result, an activation of occupant protection means is possible even in the event of a short circuit to the supply voltage. By detecting an output voltage at the second switch, it is possible to recognize from the progression of the detected voltage after activation of the second switch that a short circuit to the supply voltage is now present, which in the event of a longer activation of the second switch may result in the trigger device becoming irreparably damaged.

The device according to the present invention includes at least one first switch, at least one second switch, and at least one means for detecting an output voltage at the second switch. The device is designed in such a way that the at least one first switch and the at least one second switch must be activated to trigger the occupant protection means. Moreover, the device is designed in such a way that the device deactivates the second switch as a function of the output voltage at the second switch.

A trigger device may presently be understood to mean a component which is designed to trigger or to activate an occupant protection means, such as one or multiple airbags, one or multiple seat belt tensioners, one or multiple adjustable, so-called active, head rests, and one or multiple adjustable, in particular extendible, roll bars.

A switch may presently be understood to mean a component, preferably an electronic component, which is designed to open and close an electrical circuit. Such a switch may be provided as a discrete component or as part of an integrated component, a so-called AISC. In addition to the function as a switch, such a component may also include appropriate means to detect a voltage, in particular an output voltage, at the component and suitably output the same.

Presently a first switch, or a high side switch, is involved when the switch is situated upstream from the trigger device in a circuit in a current flow direction from an energy source to a ground potential. Presently a second switch, or a low side switch, is accordingly involved when the switch is situated downstream from the trigger device in a circuit in a current flow direction from an energy source to a ground potential.

Short circuit scenarios, which may occur when carrying out a method for operating occupant protection means or in devices for triggering occupant protection means, may be divided into three cases.

Case A: The short circuit to the supply voltage is present with low resistance at the first switch. As soon as the second switch is activated, the output voltage at the second switch drops (small values) in the ratio of the internal resistance of the connected second switch (RDS) to the (ohmic) impedance of the load, for example of the pyrotechnic and/or reversible or electromagnetic ignition means, between the first and second switches (RLAST). The current rises exponentially and is limited by the load of the trigger means of the occupant protection means. After a defined time (e.g., 3 ms), the second switch, and if necessary also the first switch, is deactivated. Today's trigger devices are designed for such a load instance and thus do not incur any irreparable damage. Moreover, the occupant protection means are successfully triggered by such an actuation.

Case B: A short circuit to the supply voltage is present with low resistance at the second switch. As soon as the second switch is activated, the output voltage at the second switch changes; however, it remains at a high level (above a shut-off threshold). If the second switch, and if necessary the first switch, were not shut off again within a very short time (approximately 100 μs), the trigger device could incur irreparable damage as a result of the very high current flow. According to the present invention, the second switch, and if necessary also the first switch, is/are thus deactivated again after Case B has been recognized. The thermal load which could occur as a result of the very high current flow through the trigger device is thereby limited. This advantageously protects the trigger device from irreparable damage. Triggering of the occupant protection means cannot be ensured in this case. Nonetheless, it is ensured that the trigger device remains intact.

Case C: A short circuit to the supply voltage is present with high resistance or in an unstable state at the second switch. Since the second switch is activated, the short circuit to the supply voltage is resolved by the rise in current, and the output voltage drops as in Case A. A premature shut-off as in Case B is not necessary in this instance. The trigger device is designed for the load that develops now and does not incur any irreparable damage. It is possible to ensure triggering of the occupant protection means.

The advantage of the method according to the present invention is that triggering of the occupant protection means is still possible in instances in which previously a short circuit was recognized (in particular even when this short circuit is resolved when the second switch is closed).

The advantage of the method according to the present invention is that it is carried out even after a short circuit to the supply voltage is recognized. Today, two strategies exist when a short circuit is recognized. It is either further attempted to trigger the restraint means, which may result in the trigger device incurring irreparable damage as a result of the high short circuit current, or triggering of the occupant protection means is aborted to protect the trigger device from the high current flows. The method according to the present invention makes it possible to ensure a triggering of the occupant protection means in certain short circuit scenarios (for example, Case A or Case C), while in scenarios (for example, Case B) in which no triggering of the occupant protection means would occur anyhow, additionally protection of the trigger device from irreparable damage is ensured, and moreover valuable energy is saved. It is thus advantageously possible to use a smaller, and thus more space-saving and more cost-effective, energy reserve for the trigger device.

In one advantageous embodiment of the method according to the present invention, the method is carried out after a short circuit to the supply voltage is recognized. In one such embodiment of the method, it is avoided that resources, such as energy reserves, must be used in a device according to the present invention, even though no short circuit is present. The existing resources are thus optimally used.

It is particularly advantageous to use the method according to the present invention for triggering occupant protection means which have at least one reversible or inductive trigger means. In contrast to non-reversible or pyrotechnic ignition means, reversible or inductive trigger means do not become high resistance after triggering. This means that it is possible for current to flow through the trigger means even after the occupant protection means have been triggered. In the instance of a short circuit, this means that a very high short circuit current may flow through the trigger means. This high short circuit current carries the risk that irreparable damage to the trigger device may occur. This risk is advantageously averted by the method according to the present invention.

Reversible trigger means may presently be understood to mean means which are suited to be triggered multiple times in their lifetime. One example of such a reversible trigger means is an electromagnetic actuator which is operated by an inductive element. Such an actuator typically has at least two positions. These are a first position, or idle position, and a second position, or working position. An activation of such an actuator moves such an actuator from an idle position into a working position. Such an actuator is then typically movable back from the working position into the idle position. However, the present invention covers all possible types of reversible trigger means.

In one advantageous embodiment of the method according to the present invention, the second switch is deactivated after a first time period if the output voltage remains above a defined limiting value for the output voltage within the first time period. If the output voltage does not drop after the second switch is activated, a short circuit of Case B exists. In the event of a short circuit according to Case B, maintaining the ignition current for a longer period would generate a thermal load on the trigger device which may result in destruction of the trigger device. The activation attempt of the occupant protection means is thus aborted after a first time period. This first time period is typically in a range of a few 100 µs. If necessary, the first switch is also deactivated after this first time period.

In the method according to the present invention, the second switch is advantageously deactivated after a second time period if the output voltage drops below a defined limiting value for the output voltage within the first time period. If the output voltage at the second switch drops below the defined limiting value, the so-called shut-off threshold, after the second switch has been activated, a short circuit scenario according to Case A or according to Case C exists. In both cases, the load that occurs through the trigger means is limited. As a result, no high current may flow through the trigger means, and thus no high thermal load on the trigger device occurs. Consequently, no risk of destruction of the trigger device exists. The second time period is the time period which is normally necessary to trigger the occupant protection means suitably for their type. This second time period is typically in the range of a few milliseconds, for example 3 ms. If necessary, the first switch is also deactivated after this second time period.

In the method according to the present invention, the first time period is advantageously shorter than the second time period. The first time period is in particular shorter by at least one power of ten than the second time period. Since the first time period is considerably shorter than the second time period and it is established within the first time period whether or not an abortion of the trigger attempt is advantageous, the method according to the present invention advantageously ensures that the trigger device is protected from thermal overload.

In one advantageous embodiment of the device according to the present invention, the device includes means for recognizing a short circuit to a supply voltage. Means for recognizing a short circuit may presently be understood to mean a component which is able to recognize the presence of a short circuit and then to output a suitable signal by detecting suitable physical variables, for example voltage levels, current intensities, voltage curves, on further components of the device.

In one advantageous embodiment of the device according to the present invention, the means for recognizing a short circuit operate cyclically. As a result of the cyclical operation, it is advantageously achieved that a short circuit is already recognized early on and not only when an activation of the trigger means is to take place.

In one advantageous embodiment of the device according to the present invention, the device has means for detecting time periods, the means for detecting time periods in particular being designed in such a way that the means detect time periods which differ by at least one power of ten. As a result of the use of such means, it is advantageously achieved that the device is able to deactivate the second switch after the shortest possible time in the event of a short circuit. In the event of a short circuit according to Case B, it is absolutely necessary to prevent further current flow through the trigger means as quickly as possible, to thereby prevent a high thermal load and possible destruction of the trigger means.

Exemplary embodiments of the present invention are shown in the following drawings and are described in greater detail in the following description. In the drawings, identical reference numerals and symbols denote elements which fulfill the same or similar functions.

DETAILED DESCRIPTION OF THE INVENTION

Figure 1:
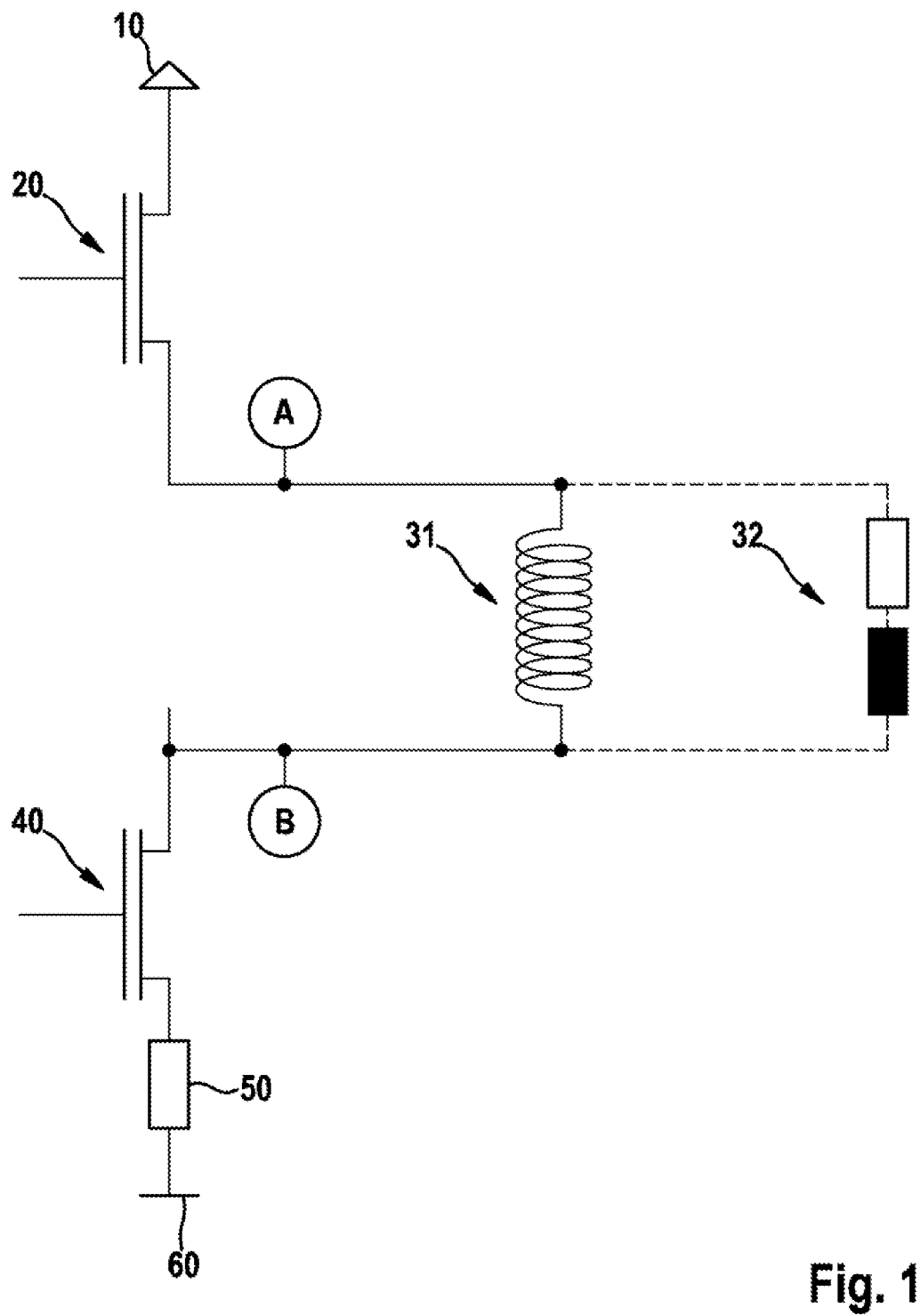
FIG. 1 shows a circuit diagram of a trigger device.

FIG. 1 shows a circuit diagram of a trigger device according to one specific embodiment of the present invention. Reference numeral 10 denotes a supply voltage, reference numeral 20 denotes a first switch or a high side switch, reference numeral 31 denotes a pyrotechnic trigger means, reference numeral 32 denotes an inductive trigger means, reference numeral 40 denotes a second switch or a low side switch, reference numeral 50 denotes a (forward slope) resistance RDSon, and reference numeral 60 denotes a ground potential.

Points A and B indicate locations at which a short circuit to a supply voltage 10 may occur. When a short circuit occurs at point A, it is referred to as a short circuit on high side switch 20. If the short circuit is present with low resistance, it involves a short circuit of Case A. When a short circuit occurs at point B, it is referred to as a short circuit on low side switch 40. If the short circuit is present with low resistance, it involves a short circuit of Case B. However, if it is present with high resistance or in an unstable state, it involves a short circuit of Case C.

Figure 2:
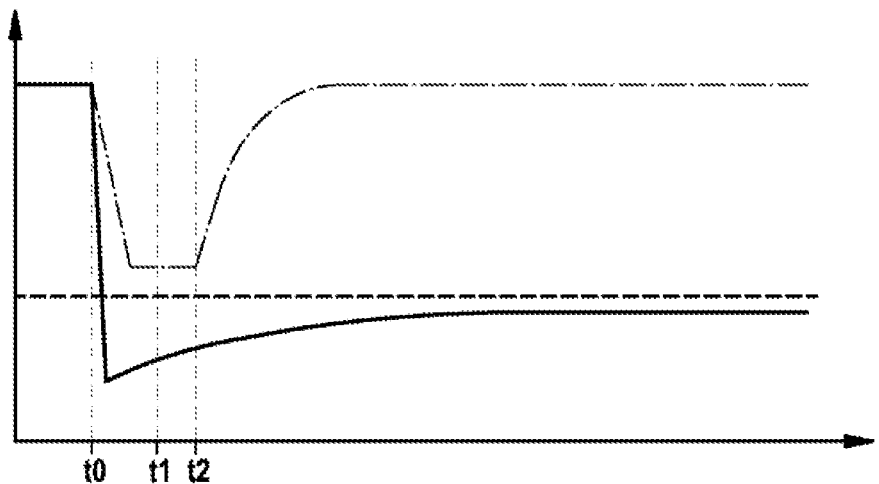
FIG. 2 shows a voltage-time diagram.

FIG. 2 shows a voltage-time diagram for short circuit scenarios at point A for pyrotechnic trigger means 31 or inductive trigger means 32. The dash-dotted line represents the voltage progression of a pyrotechnic trigger means 31 at point A. The solid curve represents the voltage progression of an inductive trigger means 32 at point A. The horizontal dotted line represents a shut-off threshold 210.

The second switch is closed at point in time t0. After a first duration t1, a decision must be made at point in time t1 whether the second switch is opened again or whether the second switch may remain closed. Triggering has occurred at point in time t2 at least with inductive trigger means.

It is clearly discernible from the diagram that the voltage progression briefly drops with pyrotechnic trigger means 31, and that after point in time t2 the voltage progression increases again to the short circuit voltage level after the ignition means were triggered. Since pyrotechnic ignition means are destroyed anyhow after triggering; the short circuit voltage is irrelevant since no short circuit current is able to flow. An excessively high thermal load is precluded, and the trigger means remain intact.

It is clearly discernible from the diagram how in Cases A and B with inductive trigger means 32 the high short circuit voltage drops and the voltage progression is limited by the load in inductive trigger means 32 and shut-off threshold 210. An excessively high thermal load is thus precluded, and the trigger means remain intact.

Figure 3:
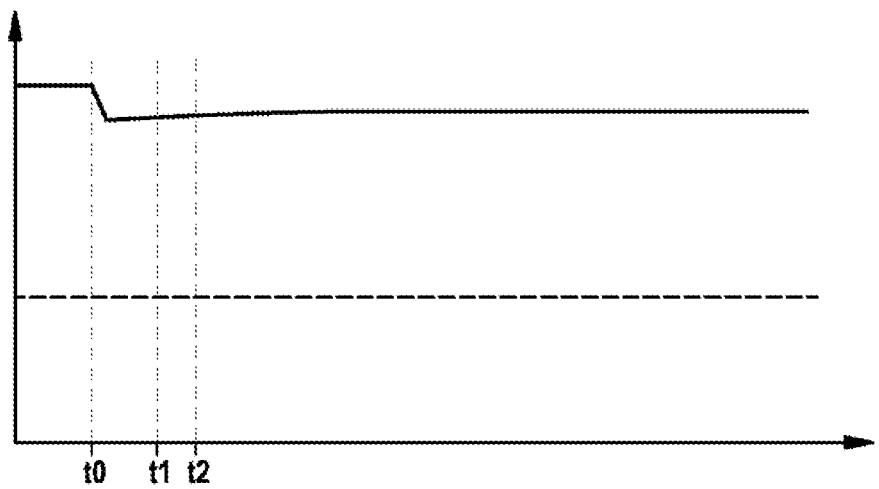
FIG. 3 shows another voltage-time diagram.

FIG. 3 shows another voltage-time diagram at point B for inductive trigger means 32. The solid line represents the voltage progression for inductive trigger means 32. The horizontal dotted line represents a shut-off threshold 210.

It is clearly discernible from the diagram that a slight voltage drop occurs at point in time t0. However, the voltage drop remains at a high level over points in time t1 and t2. Such a high voltage results in a high current with a constant resistance, as is the case in the instance of an inductive trigger means 32. This high current may result in a high thermal load on the trigger means. By deactivating the second switch in such an instance, preferably even before point in time t1, an excessively high thermal load, and thus destruction of the trigger means, may be prevented.

Figure 4:
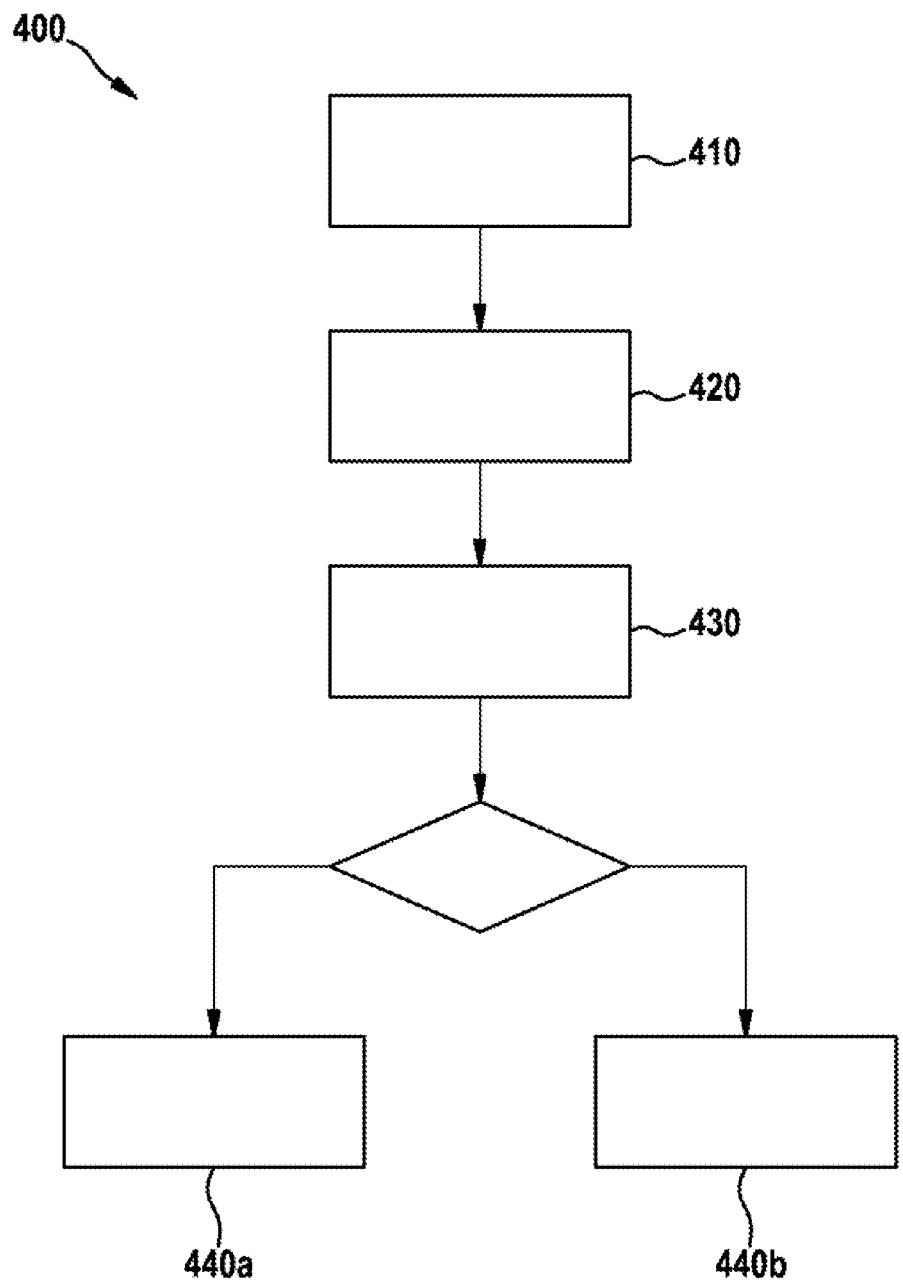
FIG. 4 shows a flow chart.

FIG. 4 shows a flow chart of the method according to the present invention. In step 410, an activation of a first switch or of a high side switch 20 takes place. In step 420, an activation of a second switch or of a low side switch 40 takes place. In step 430, a detection of an output voltage (Us) at second switch 40 takes place. As a function of the detected output voltage in step 430, thereafter either step 440a is carried out, which is a deactivation of second switch 40 after a first time duration $t_1$, or step 440b is carried out, which is a deactivation of second switch 40 after a second time duration $t_2$.

The described exemplary embodiments shown in the figures are selected only by way of example. Different exemplary embodiments may be combined with each other completely or with respect to individual features. It is also possible to supplement one exemplary embodiment with features of another exemplary embodiment. Moreover, method steps according to the present invention may be carried out repeatedly and in a different order than described.

What is claimed is:

1. A method for operating a trigger device for an occupant protection unit, comprising:
    activating a first switch of the trigger device and a second switch of the trigger device for triggering purposes to connect at least one trigger element to a voltage supply;
    detecting an output voltage at the second switch; and
    deactivating the second switch as a function of the output voltage;
    wherein the trigger device is configured to trigger activation of the occupant protection unit.

2. The method as recited in claim 1, wherein the method is carried out after a short circuit to the supply voltage is detected.

3. The method as recited in claim 2, wherein the trigger device for the occupant protection unit has an inductive trigger element.

4. The method as recited in claim 1, wherein the second switch is deactivated after a predefined first time period if the output voltage remains above a predefined limiting value for the output voltage during the first time period.

5. The method as recited in claim 4, wherein the second switch is deactivated after a predefined second time period if the output voltage drops below the predefined limiting value for the output voltage within the first time period.

6. The method as recited in claim 5, wherein the predefined first time period is shorter than the predefined second time period by at least one power of ten.

7. A device for triggering an occupant protection unit, comprising:
    a short-circuit detection unit for recognizing a short circuit to a supply voltage;
    a first switch and a second switch provided for triggering the occupant protection unit; and
    a voltage detection unit for detecting an output voltage at the second switch, wherein the second switch is deactivated as a function of the output voltage at the second switch;

wherein the device is configured to trigger activation of the occupant protection unit.

8. The device as recited in claim 7, wherein the device includes at least one inductive trigger element.

9. The device as recited in claim 8, wherein the short-circuit detection unit operates cyclically.

10. The device as recited in claim 8, further comprising a clock for detecting time periods, wherein the second switch is deactivated after a predefined first time period if the output voltage remains above a predefined limiting value for the output voltage during the first time period.

11. The device as recited in claim 10, wherein the second switch is deactivated after a predefined second time period if the output voltage drops below the predefined limiting value for the output voltage within the first time period, wherein the predefined first time period is shorter than the predefined second time period by at least one power of ten.

* * * * *